(12) United States Patent
Khalil

(10) Patent No.: US 11,814,560 B2
(45) Date of Patent: Nov. 14, 2023

(54) COMPOSITION COMPRISING NANOSIZED LIGHT EMITTING MATERIAL

(71) Applicant: Merck Patent GmbH, Darmstadt (DE)

(72) Inventor: Sanaa Khalil, Jerusalem (IL)

(73) Assignee: Merck Patent GmbH, Darmstadt (DE)

( * ) Notice: Subject to any disclaimer, the term of this patent is extended or adjusted under 35 U.S.C. 154(b) by 153 days.

(21) Appl. No.: 17/426,353

(22) PCT Filed: Jan. 27, 2020

(86) PCT No.: PCT/EP2020/051850
§ 371 (c)(1),
(2) Date: Jul. 28, 2021

(87) PCT Pub. No.: WO2020/156969
PCT Pub. Date: Aug. 6, 2020

(65) Prior Publication Data
US 2022/0098474 A1 Mar. 31, 2022

(30) Foreign Application Priority Data
Jan. 29, 2019 (EP) .................. 19154326

(51) Int. Cl.
| C09K 11/02 | (2006.01) |
| C09K 11/08 | (2006.01) |
| C09K 11/88 | (2006.01) |
| C09K 11/74 | (2006.01) |
| C09K 11/70 | (2006.01) |
| B82Y 20/00 | (2011.01) |
| B82Y 40/00 | (2011.01) |

(52) U.S. Cl.
CPC ........ *C09K 11/025* (2013.01); *C09K 11/0883* (2013.01); *C09K 11/70* (2013.01); *C09K 11/74* (2013.01); *C09K 11/883* (2013.01); *B82Y 20/00* (2013.01); *B82Y 40/00* (2013.01)

(58) Field of Classification Search
CPC ... C09K 11/025; C09K 11/02; C09K 11/0883; C09K 11/70; C09K 11/74; C09K 11/883; B82Y 20/00; B82Y 40/00
See application file for complete search history.

(56) References Cited

U.S. PATENT DOCUMENTS

| 9,701,896 | B2 | 7/2017 | Nick et al. | |
| 2015/0255690 | A1 | 9/2015 | Vo et al. | |
| 2016/0005932 | A1* | 1/2016 | Lee ...................... | C09K 11/703 |
| | | | | 252/301.36 |
| 2016/0091650 | A1* | 3/2016 | Uchiumi ................ | G02B 6/005 |
| | | | | 428/480 |
| 2016/0160060 | A1 | 6/2016 | Kikuchi et al. | |

FOREIGN PATENT DOCUMENTS

| CN | 107053780 | * | 8/2017 |
| WO | 2017/048510 A1 | | 3/2017 |

OTHER PUBLICATIONS

International Search Report dated Feb. 26, 2020 issued in corresponding PCT/EP2020/051850 application (3 pages).

* cited by examiner

*Primary Examiner* — C Melissa Koslow
(74) *Attorney, Agent, or Firm* — MILLEN WHITE ZELANO & BRANIGAN, PC; Brion Heaney

(57) ABSTRACT

The present invention relates to a composition comprising at least one nanosized light emitting material and at least compound represented by the following general formula (1) or (2), wherein Z is P, As or Sb and $R^1$, $R^2$, $R^3$, $R^4$, $R^5$ and $R^6$ are, identically or differently, selected from alkyl groups, aryl groups, heteroaryl groups, aralkyl groups, heteroaralkyl groups, alkaryl groups and alkheteroaryl groups,

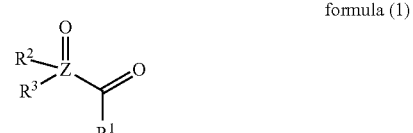
formula (1)

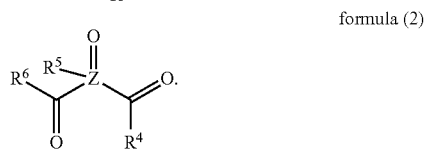

formula (2)

18 Claims, No Drawings

COMPOSITION COMPRISING NANOSIZED LIGHT EMITTING MATERIAL

FIELD OF THE INVENTION

The present invention relates to a composition comprising at least one nanosized light emitting material and at least one compound represented by the general formula (1) or (2) depicted below as an additive, and to a formulation comprising said composition. Further, the present invention relates to the use of said composition in a process for manufacturing an optical medium and to the use of said composition in a device, and to an optical medium and an optical device.

BACKGROUND OF THE INVENTION

The stability of nanosized light emitting materials, such as quantum dots (QDs), is essential for their applications in, for example, electronic, optical or biomedical devices. Stable QDs do not lose their photoluminescence intensity during processing for device fabrication and device operation, which exposes the QDs to high temperature, air, moisture and chemicals. In particular, poor thermal stability is an obstacle for practical applications of quantum dots based devices. There are various approaches described in the prior art for improving the photo- and/or thermal stability of QDs including encapsulation inside polymeric matrices, cross linking, increasing the shell thickness and the like.

A further approach to improve the stability of QDs is to combine the QDs with stabilizing additives. This combination may prevent the quantum dot particles from degradation (e.g. photo- or thermal degradation). The additive may attach to the particle surface and function as a surface modifying ligand. WO 2017/048510 A1 relates to phosphine and phosphine oxide based derivatives as stabilizing additives for nanoparticles. U.S. Pat. No. 9,701,896 B2 relates to a composition including quantum dots and an emission stabilizer, such as aliphatic phosphine oxides or aliphatic phosphate-based salts.

However, there is still a need for compounds which are capable as stabilizer additives for further improving the overall stability of nanosized light emitting materials, in particular their resistance to thermal damage.

SUMMARY OF THE INVENTION

The present invention was made in view of the problem described above. It is therefore an object of the present invention to provide a composition comprising a nanosized light emitting material which has improved stability and resistance, in particular to thermal damage, and which can retain or even increase quantum yield upon heating.

It is a further object of the present invention to provide an optical medium and an optical device having improved stability, in particular thermal stability, and high quantum yield (QY).

The present inventors have surprisingly found that one or more of the above described problems can be solved by the features as defined in the claims.

Specifically, to solve one or more of the above described problems, the present invention provides a composition that comprises, essentially consisting of, or consisting of, at least one nanosized light emitting material and at least one compound represented by the following general formula (1) or (2):

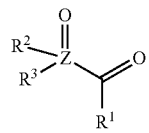

formula (1)

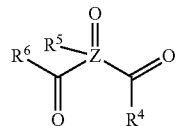

formula (2)

wherein $R^1$, $R^2$, $R^3$, $R^4$, $R^5$, $R^6$, are, identically or differently, selected from alkyl groups, aryl groups, heteroaryl groups, aralkyl groups, heteroaralkyl groups, alkaryl groups and alkylheteroaryl groups; and Z is P, As or Sb.

Further, the present invention relates to a formulation comprising the composition according to the invention and at least one solvent.

The present invention further provides for a use of the composition according to the invention or said formulation in a process for manufacturing an optical medium.

The present invention further provides for a use of the composition according to the invention or said formulation in an electronic device, optical device or biomedical device.

Further, the present invention relates to an optical medium comprising the composition according to the invention and to an optical device comprising said optical medium.

Further advantages of the invention will become evident from the following detailed description.

DETAILED DESCRIPTION OF THE INVENTION

Hereinafter, the best mode for carrying out the present invention is described in detail.

As used herein, an asterisk ("*" or "*") is generally used to denote a linkage to an adjacent unit or group, including for example, in case of a polymer, to an adjacent repeating or constitutional unit, or to another group, for example a side chain in case of a monomeric compound.

Compound

According to the present invention a composition comprising, essentially consisting of, or consisting of, at least one nanosized light emitting material and at least one compound represented by the following general formula (1) or (2) is provided to solve the object of the invention as described above:

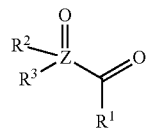

formula (1)

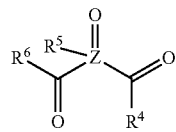

formula (2)

wherein

R$^1$, R$^2$, R$^3$, R$^4$, R$^5$, R$^6$ are, identically or differently, selected from alkyl groups, aryl groups, heteroaryl groups, aralkyl groups, heteroaralkyl groups, alkaryl groups and alkylheteroaryl groups; and Z is P, As or Sb.

The radicals R$^1$, R$^2$, R$^3$, R$^4$, R$^5$, R$^6$ in the compounds of formula (1) and (2), respectively, may in each case be substituted as will be defined below. The composition according to the invention may comprise one or more compounds of formula (1) or one or more compounds of formula (2), or the composition may comprise one or more compounds of each of formula (1) and (2), each in combination with the at least one nanosized light emitting material.

The present inventors have surprisingly found that the overall stability, and in particular the thermal stability at higher temperatures, of nanosized light emitting materials, such as quantum dots, can be improved while the quantum yield is retained or even improved by combining them with at least one compound of formula (1) and/or (2) as stabilizing additive.

The following definitions apply to the chemical groups used as general definitions. They only apply insofar as no more specific definitions are given.

An aryl group in the sense of this invention is an aromatic group that contains 5 to 30 aromatic ring atoms, of which none is a heteroatom. An aryl group here is taken to mean either a simple aromatic ring, for example benzene, or a condensed (fused) aromatic polycycle, for example naphthalene, phenanthrene, or anthracene.

A condensed aromatic polycycle in the sense of the present application consists of two or more simple aromatic rings condensed (fused) with one another. Further, aromatic groups in which two or more aryl groups are linked to one another via single bonds are also taken to be aryl groups in the sense of this invention, for example, groups such as biphenyl and terphenyl.

A heteroaryl group in the sense of this invention is an aromatic group that contains 5 to 30 aromatic ring atoms, at least one of which is a heteroatom, i.e., a heteroaromatic group. The heteroatoms are preferably selected from N, O and S. A heteroaryl group here is taken to mean either a simple heteroaromatic ring, such as pyridine, pyrimidine or thiophene, or a condensed (fused) heteroaromatic polycycle, such as quinoline or carbazole. A condensed heteroaromatic polycycle in the sense of the present application consists of two or more simple heteroaromatic rings condensed (fused) with one another.

Consequently, a heteroaryl group is defined as an aryl group above, with the difference that it must obtain at least one heteroatom as one of the aromatic ring atoms. It thereby differs from an aryl group according to the definition of the present application, which cannot comprise any heteroatom as aromatic ring atom.

An aryl or heteroaryl group, which may in each case be substituted as will be defined below and which may be linked to the atom Z via any desired positions, is taken to mean, in particular, groups derived from benzene, naphthalene, anthracene, phenanthrene, pyrene, dihydropyrene, chrysene, perylene, fluoranthene, benzanthracene, benzophenanthrene, tetracene, pentacene, benzopyrene, furan, benzofuran, isobenzofuran, dibenzofuran, thiophene, benzothiophene, isobenzothiophene, dibenzothiophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazin-imidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine, benzo-thiadiazole, biphenyl, terphenyl, quaterphenyl, fluorine and spirobifluorene.

An alkaryl group in the sense of this invention is understood to mean an aryl group as defined above, to which an alkyl group as defined below is bonded.

An alkylheteroaryl group in the sense of this invention is understood to mean a heteroaryl group as defined above, to which an alkyl group as defined below is bonded.

For the purposes of the present invention, an alkyl group is taken to mean a saturated, monovalent straight-chain alkyl group having 1 to 20, 1 to 30 or 1 to 40 C atoms or branched or cyclic alkyl group having 3 to 30 or 3 to 40 C atoms, which, in addition, may in each case be substituted as will be defined below, and in particular is taken to mean the groups methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoro-ethyl or 2,2,2-trifluoroethyl.

Further, for the purposes of the present invention, an alkenyl or alkynyl group is taken to mean an unsaturated monovalent straight chain or branched alkenyl or alkynyl group having 2 to 40 C atoms, which, in addition, may in each case be substituted as will be defined below, and in particular is taken to mean the groups ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl.

An aralkyl group in the sense of this invention is understood to mean an alkyl group as defined above, to which an aryl group as defined above is bonded.

A heteroarylalkyl group in the sense of this invention is understood to mean an alkyl group as defined above, to which a heteroaryl group as defined above is bonded.

An alkoxy group having 1 to 20 C atoms, which, in addition, may be substituted as will be defined below, is preferably taken to mean methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy or 2,2,2-trifluoroethoxy.

Preferably, in the compound of formulae (1) and (2) R$^1$, R$^2$, R$^3$, R$^4$, R$^5$, R$^6$ are, identically or differently, selected from alkyl groups selected from straight-chain alkyl groups having 1 to 30 C atoms, more preferably 1 to 20 C atoms, and branched or cyclic alkyl groups having 3 to 30 C atoms, more preferably 3 to 20 C atoms, from aryl groups selected from aromatic groups having 5 to 30 aromatic ring atoms, more preferably 5 to 18 aromatic ring atoms, and from heteroaryl groups selected from heteroaromatic groups having 5 to 30 aromatic ring atoms, more preferably 5 to 18 aromatic ring atoms, where the said straight-chain, branched and cyclic alkyl groups and the said aromatic and heteroaromatic groups may in each case be substituted (that is, one or more H atoms in said straight-chain, cyclic or branched alkyl groups or in said aromatic or heteroaromatic groups may be replaced) by one or more radicals $R^7$;

wherein $R^7$ is selected, identically or differently, from F, Cl, Br, I, CN, $NH_2$, $N(R^8)_2$, OH, $NHC(O)R^8$, $OR^8$, an acrylate group ($-OC(O)CHCH_2$) or methacrylate group ($-OC(O)C(CH_3)CH_2$), straight-chain alkyl groups having 1 to 20 C atoms, branched alkyl groups having 3 to 20 C atoms, aromatic groups having 5 to 30 aromatic ring atoms, and heteroaromatic groups having 5 to 30 aromatic ring atoms, where one or more H atoms in said straight-chain or branched alkyl groups or in said aromatic or heteroaromatic groups may be replaced by F, Cl, Br, I and/or CN; and wherein $R^8$ is selected, identically or differently, from straight-chain alkyl groups having 1 to 20 C atoms and branched alkyl groups having 3 to 20 C atoms, in which one or more H atoms may be replaced by F, Cl, Br, I and/or CN.

Particularly, in case where a radical $R^1$, $R^2$, $R^3$, $R^4$, $R^5$, $R^6$ is an aryl or a heteroaryl group, as defined above, $R^7$ is more preferably selected, identically or differently, from F, Cl, Br, I, CN, $NH_2$, $N(R^8)_2$, OH, $NHC(O)R^8$, $OR^8$, an acrylate group ($-OC(O)CHCH_2$) or methacrylate group ($-OC(O)C(CH_3)CH_2$), straight-chain alkyl groups having 1 to 20 C atoms, branched alkyl groups having 3 to 20 C atoms, where one or more H atoms in said straight-chain or branched alkyl groups may be replaced by F, Cl, Br, I and/or CN; and $R^8$ is selected, identically or differently, from straight-chain alkyl groups having 1 to 10 C atoms and branched alkyl groups having 3 to 10 C atoms, in which one or more H atoms may be replaced by F, Cl, Br, I and/or CN.

Particularly, in case where a radical $R^1$, $R^2$, $R^3$, $R^4$, $R^5$, $R^6$ is an alkyl group, as defined above, the alkyl group more preferably may be substituted by one or more groups selected from F, Cl, Br, I, CN, an acrylate group ($-OC(O)CHCH_2$) or methacrylate group ($-OC(O)C(CH_3)CH_2$), aromatic groups having 5 to 20 aromatic ring atoms, and heteroaromatic groups having 5 to 20 aromatic ring atoms.

According to a preferred embodiment of the present invention, at least one of $R^1$, $R^2$ and $R^3$ and at least one of $R^4$, $R^5$ and $R^6$ is an aryl or a heteroaryl group. More preferably, at least one of $R^1$, $R^2$ and $R^3$ and at least one of $R^4$, $R^5$ and $R^6$ is an aryl group.

For example, in the compound represented by formula (1) $R^1$ is an aryl or a heteroaryl group as defined above, and $R^2$ and $R^3$ are, identically or differently, alkyl groups as defined above. Or $R^2$ is an aryl or a heteroaryl group as defined above, and $R^1$ and $R^3$ are, identically or differently, alkyl groups as defined above. Or $R^3$ is an aryl or a heteroaryl group as defined above, and $R^1$ and $R^2$ are, identically or differently, alkyl groups as defined above.

In the compound represented by formula (2), for example, $R^4$ is an aryl or a heteroaryl group as defined above, and $R^5$ and $R^6$ are, identically or differently, alkyl groups as defined above. Or $R^5$ is an aryl or a heteroaryl group as defined above, and $R^4$ and $R^6$ are, identically or differently, alkyl groups as defined above. Or $R^6$ is an aryl or a heteraryl group as defined above, and $R^4$ and $R^5$ are, identically or differently, alkyl groups as defined above.

According to a further preferred embodiment of the present invention, at least two of $R^1$, $R^2$ and $R^3$ and at least two of $R^4$, $R^5$ and $R^6$ are, identically or differently, selected from aryl and heteroaryl groups. More preferably, at least two of $R^1$, $R^2$ and $R^3$ and at least two of $R^4$, $R^5$ and $R^6$ are, identically or differently, selected from aryl groups.

For example, in the compound represented by formula (1) $R^1$ and $R^2$ are, identically or differently, aryl and/or heteroaryl groups as defined above, and $R^3$ is an alkyl group as defined above. Or $R^1$ and $R^3$ are, identically or differently, aryl and/or heteroaryl groups as defined above, and $R^2$ is an alkyl group as defined above. Or $R^2$ and $R^3$ are, identically or differently, aryl and/or heteroaryl groups as defined above, and $R^1$ is an alkyl group as defined above.

In the compound represented by formula (2), for example, $R^4$ and $R^5$ are, identically or differently, aryl and/or heteroaryl groups as defined above, and $R^6$ is an alkyl group as defined above. Or $R^4$ and $R^6$ are, identically or differently, aryl and/or heteroaryl groups as defined above, and $R^5$ is an alkyl group as defined above. Or $R^5$ and $R^6$ are, identically or differently, aryl and/or heteroaryl groups as defined above, and $R^4$ is an alkyl group as defined above.

According to a further preferred embodiment of the present invention, $R^1$, $R^2$, $R^3$ in formula (1) and $R^4$, $R^5$ and $R^6$ in formula (2) are, identically or differently, selected from aryl and heteroaryl groups, more preferably from aryl groups, for example as defined above.

More preferably, $R^1$, $R^2$, $R^3$, $R^4$, $R^5$ and $R^6$ are, identically or differently, selected from aromatic groups having 5 to 18 aromatic ring atoms and heteroaromatic groups having 5 to 18 aromatic ring atoms, even more preferably from aromatic groups having 5 to 18 aromatic ring atoms only, which may in each case be substituted by one or more radicals $R^7$; wherein $R^7$ is selected, identically or differently, from F, Cl, Br, I, CN, $NH_2$, $N(R^8)_2$, OH, $NHC(O)R^8$, $OR^8$, an acrylate group ($-OC(O)CHCH_2$) or methacrylate group ($-OC(O)C(CH_3)CH_2$), straight-chain alkyl groups having 1 to 20 C atoms, branched alkyl groups having 3 to 20 C atoms, where one or more H atoms in said straight-chain or branched alkyl groups may be replaced by F, Cl, Br, I and/or CN; and $R^8$ is selected, identically or differently, from straight-chain alkyl groups having 1 to 10 C atoms and branched alkyl groups having 3 to 10 C atoms, in which one or more H atoms may be replaced by F, Cl, Br, I and/or CN. According to another preferred embodiment of the invention, all of $R^1$, $R^2$ and $R^3$ in formula (1) and of $R^4$, $R^5$ and $R^6$ in formula (2) are alkyl groups, for example as defined above.

More preferably, $R^1$, $R^2$, $R^3$, $R^4$, $R^5$ and $R^6$ are, identically or differently, selected from straight-chain alkyl groups having 1 to 20 C atoms and branched alkyl groups having 3 to 20 C atoms, which may in each case be substituted by one or more groups selected from F, Cl, Br, I, CN, an acrylate group ($-OC(O)CHCH_2$) or methacrylate group ($-OC(O)C(CH_3)CH_2$), aromatic groups having 5 to 20 aromatic ring atoms, and heteroaromatic groups having 5 to 20 aromatic ring atoms.

It is further preferably according to the present invention with respect to the above that at least one of groups $R^1$, $R^2$, $R^3$ in formula (1) and at least one of groups $R^4$, $R^5$ and $R^6$ in formula (2) includes an acrylate ($-OC(O)CHCH_2$) or methacrylate ($-OC(O)C(CH_3)CH_2$) functional group. That is, preferably at least one of groups $R^1$, $R^2$, $R^3$ in formula (1) and at least one of groups $R^4$, $R^5$ and $R^6$ in formula (2) is substituted by one or more acrylate groups ($-OC(O)CHCH_2$) or methacrylate groups ($-OC(O)C(CH_3)CH_2$), no matter whether $R^1$, $R^2$, $R^3$, $R^4$, $R^5$, $R^6$ are, identically or differently, alkyl groups, aryl groups, heteroaryl groups, aralkyl groups, heteroaralkyl groups, alkaryl groups or alkylheteroaryl groups.

It has surprisingly been found that if the compound of general formula (1) and (2) includes an acrylate and/or methacrylate group, crosslinking with polymerizable additives optionally comprised in the composition according to the invention, such as a polymerizable matrix material (see below), can be achieved, resulting in further improved stability of the nanosized light emitting materials.

Further preferably, Z in the compounds of formula (1) and (2) is P. Particularly preferred compounds according to general formula (1) and (2) are listed in the following table:

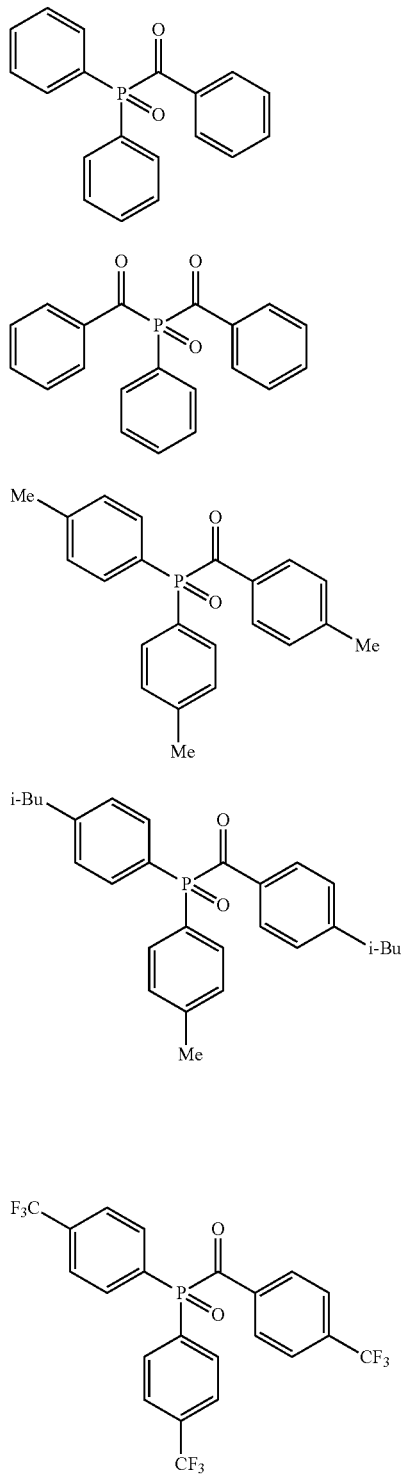

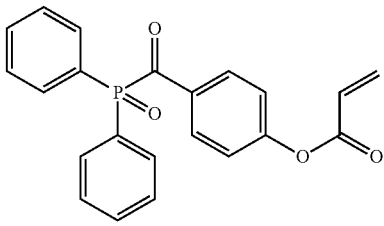

It is further preferred according to the invention that the composition comprises at least one compound of general formula (1) or at least one compound of general formula (2).

The total amount of the compound of formula (1) and/or (2) in the composition is preferably in the range from 1 wt.-% to 40 wt.-%, more preferably from 4 wt.-% to 32 wt.-%, and even more preferably from 4 wt.-% to 20 wt.-%, based on the inorganic part of the nanosized light emitting material(s) comprised in the composition (i.e., the quantum material or quantum dots part without any possible organic coating layer(s)). If the total amount of the compound of formula (1) and/or (2) is in the above range, the best results with respect to stabilizing effect and high quantum yield could be achieved, without being limited thereto.

It may further be preferred according to the invention that the composition further comprises a surface modifying ligand attached to the surface of the at least one nanosized light emitting material, said ligand preferably being represented by the following general formula (3) or (4):

$$R^9\text{—SH} \qquad \text{formula (3)}$$

$$R^{10}\text{—}(CH_2)_n\text{—SH} \qquad \text{formula (4)}$$

wherein $R^9$ is selected from straight-chain alkyl groups having 1 to 40 C atoms, branched or cyclic alkyl groups having 3 to 40 C atoms, and alkenyl or alkynyl groups having 2 to 40 C atoms;

$R^{10}$ is selected from aromatic or heteroaromatic groups having 5 to 30 aromatic ring atoms, which may in each case be substituted by one or more groups selected from F, Cl, Br, I, CN, straight-chain alkyl groups having 1 to 20 C atoms and alkoxy groups having 3 to 20 C atoms; and n is 0 to 16.

That is, the at least one nanosized light emitting material comprised in the composition of the invention in combination with the at least one compound of formula (1) or (2) may have a surface modifying ligand attached or bound (which terms are used interchangeably herein) to its surface, which is preferably selected from the compounds represented by general formula (3) or (4).

Ligands represented by the general formula (3) or (4) have been proven to be highly efficient in improving stability of nanosized light emitting materials such as quantum dots, in particular against radical treatment. It has surprisingly been found that by combining thiol-containing ligands with the compounds of the general formula (1) and/or (2) in the composition of the invention the stability of nanosized light emitting materials can be further improved, in particular against both radical and thermal treatment.

Nanosized Light Emitting Material

According to the present invention, as an inorganic part of the nanosized light emitting material a wide variety of publicly known semiconducting nanosized light emitting materials can be used as desired.

The term "nano" or "nanosized" means the size in the range of 0.1 nm to 999 nm, preferably 1 nm to 150 nm, more preferably 3 nm to 50 nm.

Thus, according to the present invention the nanosized light emitting material is taken to mean a light emitting material which size is in the range of 0.1 nm to 999 nm, preferably of 0.1 nm to 150 nm, more preferably of 3 nm to 50 nm.

According to the present invention, the term "size" means the average diameter of the longest axis of the nanosized light emitting particles. The average diameter of the nanosized light emitting particles is calculated based on 100 light emitting nanoparticles in a TEM image created by a Tecnai G2 Spirit Twin T-12 Transmission Electron Microscope.

A type of shape of the nanosized light emitting material of the present invention is not particularly limited. Any type of nanosized light emitting materials, for examples, spherical shaped, elongated shaped, star shaped, polyhedron shaped, tetrapod shaped, tetrahedron shaped, platelet shaped, cone shaped, and irregular shaped semiconducting nanosized light emitting particles can be used.

In a preferred embodiment of the present invention, the nanosized light emitting material can be selected from the group consisting of nanosized inorganic phosphor materials, quantum sized materials, such as quantum dots or quantum rods, and a combination of any of these.

More preferably, the nanosized light emitting material is a quantum sized material, with furthermore preferably being of a quantum dot material, quantum rod material or a combination of any of these.

As used herein, the term "quantum sized" means the size of the inorganic, semiconducting light emitting material itself, i.e., without ligands or any other surface modification, which can show the quantum confinement effect, like described in, for example, ISBN:978-3-662-44822-9. Generally, it is said that quantum sized materials such as quantum dot material and/or quantum rod material can emit tunable, sharp and vivid colored light due to "quantum confinement" effect.

Preferably, the size of the overall structure of the quantum sized material is from 1 nm to 100 nm, more preferably, it is from 1 nm to 30 nm, even more preferably, it is from 5 nm to 15 nm.

As a quantum dot, publicly available quantum dot, for examples, CdSeS/ZnS alloyed quantum dots product number 753793, 753777, 753785, 753807, 753750, 753742, 753769, 753866, InP/ZnS quantum dots product number 776769, 776750, 776793, 776777, 776785, PbS core-type quantum dots product number 747017, 747025, 747076, 747084, or CdSe/ZnS alloyed quantum dots product number 754226, 748021, 694592, 694657, 694649, 694630, 694622 from Sigma-Aldrich, can be used preferably as desired.

In another preferred embodiment of the present invention, the nanosized light emitting material is a semiconducting light emitting nanoparticle having a core-shell-structure, wherein a core is surrounded by one or more shell layers.

According to the present invention, said one or more shell layers of the semiconducting light emitting nanoparticle is preferably a single shell layer, a double shell layer, or multishell layers having more than two shell layers, most preferably it is a double shell layer.

As used herein, the term "shell layer" means the structure covering fully or partially said core. Preferably, said one or more shell layers fully covers said core. The terms "core" and "shell" are well known in the art and typically used in the field of quantum materials, such as U.S. Pat. No. 8,221,651 B2.

According to the present invention, said core of the semiconducting light emitting nanoparticle can vary. For example, CdS, CdSe, CdTe, ZnS, ZnSe, ZnSeS, ZnTe, ZnO, GaAs, GaP, GaSb, HgS, HgSe, HgSe, HgTe, InAs, InP, InPS, InPZnS, InPZn, InPGa, InSb, AlAs, AlP, AlSb, $Cu_2S$, $Cu_2Se$, CuInS2, $CuInSe_2$, $Cu_2(ZnSn)S_4$, $Cu_2(InGa)S_4$, $TiO_2$ alloys and a combination of any of these can be used.

In a preferred embodiment of the present invention, said core of the semiconducting light emitting nanoparticle comprises one or more of group 13 elements of the periodic table and one or more of group 15 elements of the periodic table. For example, GaAs, GaP, GaSb, InAs, InP, InPS, InPZnS, InPZn, InPGa, InSb, AlAs, AlP, AlSb, CuInS2, $CuInSe_2$, $Cu_2(InGa)S_4$, and a combination of any of these.

Even more preferably, the core comprises In and P atoms, for example, InP, InPS, InPZnS, InPZn or InPGa.

According to a further preferred embodiment of the present invention, said at least one of the shell layers comprises a $1^{st}$ element of group 12, 13 or 14 of the periodic table and a $2^{nd}$ element of group 15 or 16 of the periodic table. Preferably, all shall layers comprise a $1^{st}$ element of group 12, 13 or 14 of the periodic table and a $2^{nd}$ element of group 15 or 16 of the periodic table.

More preferably, at least one of the shell layers comprises a $1^{st}$ element of group 12 of the periodic table and a $2^{nd}$ element of group 16 of the periodic table. For example, CdS, CdZnS, ZnS, ZnSe, ZnSSe, ZnSSeTe, CdS/ZnS, ZnSe/ZnS or ZnS/ZnSe shell layers can be used. Even more preferably, all shall layers comprise a 1st element of group 12 of the periodic table and a $2^{nd}$ element of group 16 of the periodic table.

Particularly preferably, at least one shell layer is represented by following formula (5), $$ZnS_xSe_yTe_z,\qquad\text{formula (5)},$$

in which 0≤x≤1, 0≤y≤1, 0≤z≤1, and x+y+z=1, with 0≤x≤1, 0≤y≤1, z=0, and x+y=1 being even more preferred.

ZnS, ZnSe, ZnSeS, ZnSeSTe, CdS/ZnS, ZnSe/ZnS, ZnS/ZnSe shell layers are most preferably used.

It is further preferred that all shell layers are represented by formula (5). For example, as a core-shell semiconducting light emitting nanoparticle for green and/or red emission use, CdSe/CdS, CdSeS/CdZnS, CdSeS/CdS/ZnS, ZnSe/CdS, CdSe/ZnS, InP/ZnS, InP/ZnSe, InP/ZnSe/ZnS, InP/ZnS/ZnSe, InPZn/ZnS, InPZn/ZnSe/ZnS, InPZn/ZnS/ZnSe, ZnSe/CdS, ZnSe/ZnS semiconducting light emitting nanoparticle or combination of any of these, can be used.

More preferably, InP/ZnS, InP/ZnSe, InP/ZnSe/ZnS, InP/ZnS/ZnSe, InPZn/ZnS, InPZn/ZnSe/ZnS, InPZn/ZnS/ZnSe can be used.

In a preferred embodiment of the present invention, said shell layers of the semiconducting light emitting nanoparticle are double shell layers.

Said semiconducting light emitting nanoparticles are publicly available, for example, from Sigma-Aldrich and/or described in, for example, *ACS Nano*, 2016, 10 (6), pp 5769-5781, Chem. Moter. 2015, 27, 4893-4898, and the international patent application No. WO 2010/095140 A2.

Thus, according to a preferred embodiment of the invention, the composition comprises, essentially consisting of, or consisting of,
  a) at least one semiconducting light emitting nanoparticle comprising a core and optionally at least one shell layer, and
  b) at least one compound represented by the general formula (1) or (2), as defined above.

According to a further preferred embodiment of the invention, the composition comprises, essentially consisting of, or consisting of,
  a) at least one semiconducting light emitting nanoparticle comprising a core, at least one optional shell layer and a surface modifying ligand represented by the general formula (3) or (4) attached to the outermost particle surface, and
  b) at least one compound represented by the general formula (1) or (2), as defined above.

The nanosized light emitting material, such as quantum rods and/or quantum dots and/or semiconducting light emitting nanoparticles, may further have one or more different types of surface modifying ligands attached to its surface, in addition to the compounds of formula (1) and/or (2) and optional ligands of general formula (3) or (4). Thus, the outermost surface of the light emitting material or the shell layers of the semiconducting light emitting nanoparticles may be over coated with one or more kinds of surface modifying ligands together with the compounds of formula (1) and/or (2) and optionally together with the ligands of general formula (3) or (4).

Without wishing to be bound by theory it is believed that such surface ligands may lead to disperse the nanosized light emitting material in a solvent more easily. Such surface ligands in common use include phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), Octadecylphosphonic acid (ODPA), and Hexylphosphonic acid (HPA); amines such as Oleylamine, Dedecyl amine (DDA), Tetradecyl amine (TDA), Hexadecyl amine (HDA), and Octadecyl amine (ODA), Oleylamine (OLA), 1-Octadecene (ODE), thiols such as hexadecane thiol and hexane thiol; mercapto carboxylic acids such as mercapto propionic acid and mercaptoundecanoicacid; carboxylic acids such as oleic acid, stearic acid, myristic acid; acetic acid and a combination of any of these. And. Polyethylenimine (PEI) also can be used preferably.

Examples of surface ligands have been described in, for example, the laid-open international patent application No. WO 2012/059931A.

Further Additives

The composition of the present invention may contain other additives, if necessary. Examples of the further additives include, but are not limited to, an organic light emitting material, an inorganic light emitting material, a charge transporting material, scattering particles, a host material, nanosized plasmonic particles, a photo initiator, and a matrix material.

Said inorganic fluorescent material preferably may be selected from one or more member of the group consisting of sulfides, thiogallates, nitrides, oxynitrides, silicate, aluminates, apatites, borates, oxides, phosphates, halophosphates, sulfates, tungstenates, tantalates, vanadates, molybdates, niobates, titanates, germinates, halides-based phosphors, and a combination of any of these.

Such suitable inorganic fluorescent materials described above can be well known phosphors including nanosized phosphors, quantum sized materials like mentioned in the phosphor handbook, $2^{nd}$ edition (CRC Press, 2006), pp. 155 pp. 338 (W. M. Yen, S. Shionoya and H. Yamamoto), WO2011/147517A, WO2012/034625A, and WO2010/095140A.

According to the present invention, as said organic light emitting materials, charge transporting materials, any type of publicly known materials can be used preferably. For example, well known organic fluorescent materials, organic host materials, organic dyes, organic electron transporting materials, organic metal complexes, and organic hole transporting materials.

As the scattering particles, small particles of inorganic oxides such as $SiO_2$, $SnO_2$, CuO, CoO, $Al_2O_3$ $TiO_2$, $Fe_2O_3$, $Y_2O_3$, ZnO, MgO; organic particles such as polymerized polystyrene, polymerized PMMA; inorganic hollow oxides such as hollow silica or a combination of any of these; can be used preferably.

According to the present invention, as the light scattering particles, any type of publicly known light scattering particles having different refractive index from the matrix material of the layer which includes said light scattering particles and can give Mie scattering effects, may be used preferably as desired.

According to the present invention, a wide variety of publicly known transparent polymers suitable for optical devices can be used preferably as a matrix material.

According to the present invention, the term "transparent" means at least around 60% of incident light transmit at the thickness used in an optical medium and at a wavelength or a range of wavelength used during operation of an optical medium. Preferably, it is over 70%, more preferably, over 75%, the most preferably, it is over 80%.

In a preferred embodiment of the present invention, any type of publicly known transparent polymers, described in for example, WO 2016/134820A can be used.

According to the present invention the term "polymer" means a material having a repeating unit and having the weight average molecular weight (Mw) 1000 g/mol, or more.

The molecular weight Mw is determined by means of GPC (=gel permeation chromatography) against an internal polystyrene standard.

In some embodiments of the present invention, the glass transition temperature (Tg) of the transparent polymer is 70° C. or more and 250° C. or less.

Tg is measured based on changes in the heat capacity observed in Differential scanning colorimetry like described in http://pslc.ws/macrog/dsc.htm; Rickey J Seyler, Assignment of the Glass Transition, ASTM publication code number (PCN) 04-012490-50.

For example, as the transparent polymer for the transparent matrix material, poly(meth)acrylates, epoxys, polyurethanes, polysiloxanes, can be used preferably.

In a preferred embodiment of the present invention, the weight average molecular weight (Mw) of the polymer as the transparent matrix material is in the range from 1,000 to 300,000 g/mol, more preferably it is from 10,000 to 250,000 g/mol.

Formulation

The present invention further provides for a formulation comprising the composition of the invention as defined above, and at least one solvent. Preferably the solvent is selected from one or more members of the group consisting of aromatic, halogenated and aliphatic hydrocarbons solvents, more preferably selected from one or more members of the group consisting of toluene, xylene, ethers, tetrahydrofuran, chloroform, dichloromethane heptane, purified water, ester acetates, alcohols, sulfoxides, formamides, nitrides, ketones.

The amount of the solvent in the formulation can be freely controlled according to the method of coating the composition. For example, if the composition is to be spray-coated, it can contain the solvent in an amount of 90 wt. % or more.

Further, if a slit-coating method, which is often adopted in coating a large substrate, is to be carried out, the content of the solvent is normally 60 wt. % or more, preferably 70 wt. % or more.

Use

The present invention further relates to a use of the composition according to the invention as defined above or the formulation according to the invention as defined above in a process for manufacturing an optical medium.

The process for manufacturing the optical medium preferably comprises the following steps 1) and 2) in this sequence:
1) providing the composition of the invention as defined above or the formulation of the invention as described above onto a substrate, and
2) applying heat to the composition or formulation provided onto the substrate.

To provide the composition or formulation onto the substrate according to step 1), any type of publicly known coating method can be used preferably. For examples, immersion coating, gravure coating, roll coating, bar coating, brush coating, spray coating, doctor coating, flow coating, spin coating, and slit coating.

The substrate to be coated in step 1) is also not particularly limited, and can be properly selected from, for example, a silicon substrate, a glass substrate and a polymer or resin film. The substrate may be solid or flexible, and transparent or intransparent.

The step 2) of heating the composition or formulation provided onto the substrate is applied for the purposes of drying and of reducing the solvent remaining therein.

The heating is preferably carried out at a temperature of 50 to 150° C., more preferably 90 to 150° C., for 10 to 300 seconds, preferably 30 to 120 seconds on a hotplate or for 1 to 30 minutes in a clean oven. Further, according to necessity, the step of providing the composition or formulation onto the substrate may be repeatedly carried out once or twice or more so as to form a coating or film of desired thickness.

In a preferred embodiment of the present invention, optionally, after step 2) a polymerizing step 3) can be applied to the dried composition or formulation provided onto the substrate, for example by exposing radiation.

As a source of radiation for the exposure, it is possible to adopt any light source used in conventional pattern-formation processes. According to the present method, there are no particular restrictions on the environmental conditions in the exposure, and the exposure can be carried out under an ambient atmosphere (the normal atmosphere) or under a nitrogen atmosphere.

After the optional polymerizing step 3), optionally, post-exposure baking can be carried out according to necessity with the aim of promoting interpolymer reactions caused by the reaction initiator in the exposed area of the coating. The temperature of the post-exposure baking is preferably 40 to 150° C., more preferably 60 to 150° C. The post-exposure baking step can be carried out using a hot-plate, an oven, a furnace or the like. There are no particular restrictions on the atmosphere during baking. The baking time is preferably 20 to 500 seconds, more preferably 40 to 300 seconds, so as to keep higher uniformity of thermal budget in the wafer surface but also to prevent the diffusion of acid.

The optical medium thus obtained, which may be an optical sheet, such as a color filter, a color conversion film, a remote phosphor tape, or another film or filter, has increased stability, in particular thermal stability, and can achieve high quantum yield.

Therefore, the present invention also relates to an optical medium obtained or obtainable by the process for manufacturing of the invention.

Furthermore, the invention relates to a use of the composition according to the invention as defined above or the formulation according to the invention as defined above in an electronic device, optical device, in a biomedical device or for fabricating an electronic device, optical device or a biomedical device.

A process for fabricating an electronic device, optical device or a biomedical device, which devices will be defined below, comprises the following step A):
A) providing an optical medium prepared according to the process of the invention as described above in an electronic device, optical device or a biomedical device.

Optical Medium

The present invention further relates to an optical medium comprising the composition according to the invention as defined above.

The optical medium may be an optical sheet, for example, a color filter, color conversion film, remote phosphor tape, or another film or filter.

According to the present invention, the term "sheet" includes film and/or layer like structured mediums.

Preferably, the optical medium comprises an anode and a cathode, and at least one layer comprising the composition of the present invention. Preferably said one layer is an organic layer, more preferably said organic layer is a light emission layer.

Preferably said light emitting layer comprises at least one organic material selected from hole transporting material, electron transporting material, host material, hole injection material, electron injection material, like as described in WO 2018/024719 A1, US2016/233444 A2, U.S. Pat. No. 7,754, 841 B, WO 2004/037887 and WO 2010/097155.

The total amount of the composition in the light emission layer based on the total amount of the light emission layer is in the range from 0.001 wt % to 99.99%.

More preferably the medium further comprises one or more additional layers selected from the group consisting of hole injection layers, hole transporting layers, electron blocking layers, hole blocking layers, electron blocking layers, and electron injection layers.

According to the present invention, any kinds of publicly available inorganic, and/or organic materials for hole injection layers, hole transporting layers, electron blocking layers, light emission layers, hole blocking layers, electron blocking layers, and electron injection layers can be used preferably, like as described in WO 2018/024719 A1, US2016/233444 A2, U.S. Pat. No. 7,754,841 B, WO 2004/ 037887 and WO 2010/097155.

Preferably, the anode and the cathode of the optical medium sandwich the organic layer. More preferably said additional layers are also sandwiched by the anode and the cathode.

Particularly preferably, the organic layer comprises the composition of the present invention, and a host material, preferably the host material is an organic host material.

Optical Device

The present invention further provides for an optical device comprising an optical medium of the present invention.

The optical device may preferably be a liquid crystal display device (LCD), an organic Light Emitting Diode (OLED), a backlight unit for an optical display, a Light Emitting Diode device (LED), a Micro Electro Mechanical Systems (MEMS), an electro wetting display, or an electrophoretic display, a lighting device, and/or a solar cell.

The invention will be described in more detail in reference to the following examples, which are only illustrative and do not limit the scope of the invention.

WORKING EXAMPLES

Working Example 1—Synthesis of InP/ZnSe Quantum Material 0.7 µL InP cores are prepared with publicly available method, like described in WO 2018/215396 A1, then it is mixed with 600 µL toluene and moved to a 4-neck flask. Then 18.8 mL oleylamine and 4.4 mL $ZnCl_2$ are added. The mixture is kept at 35° C. under vacuum for 30 min. Afterwards, the mixture is heated to 250° C. for 30 min under argon.

After the above core treatment, the mixture is cooled down to 190° C., and 10.4 mL of $ZnCl_2$ in oleylamine is added. At 180° C., 1.8 mL TOP:Se (2M) is injected. The mixture is heated to 200° C. for 30 min, then to 320° C., followed by injection of 12.4 mL zinc undecylanate in oleylamine (0.4M).

Working Example 2—Purification of Quantum Material Obtained from Example 1

1 mL of a sample obtained from example 1 is purified from excess ligands using toluene and ethanol as solvent and antisolvent, respectively, followed by centrifugation and drying. The cleaning is repeated twice. The solid obtained is then dissolved in hexane and again centrifuged. Hexane is evaporated, and the quantum dots are dissolved in toluene. The amount of organic ligands is calculated using thermal gravimetric analysis (TGA) (model TGA2, Metler Toledo). TG analysis showed 15 wt.-% of organic content.

30 mg of the quantum dots obtained are dissolved in 1 mL toluene (30 mg/mL). Quantum yield (QY) is measured using Hamamatsu absolute quantum yield spectrometer (model: Quantaurus C11347).

Working Example 3—Stability in Thermal Test of Quantum Material Obtained from Example 2

0.5 mL of quantum dots in toluene (30 mg/mL) are dried under argon to remove toluene. The vial is then opened to air and heated at 150° C. for 1 hour. Afterwards, the solid is re-dissolved in toluene and QY is measured using Hamamatsu absolute quantum yield spectrometer (model: Quantaurus C11347).

Working Example 4—Stability in Thermal Test of Quantum Material Obtained from Example 2 with TPO, PPO, TOPO, TPPO, TOP and BPh 0.5 mL of quantum dots in toluene (30 mg/mL) are added to another vial containing 1.2 mg (8 wt. %) of each of the following additives separately: TPO, PPO, TOPO, TPPO, TOP and BPh (see table 1 below). Toluene is evaporated, and the vial is opened to air and heated at 150° C. for 1 hour. Afterwards, the solid is re-dissolved in toluene and QY is measured using Hamamatsu absolute quantum yield spectrometer (model: Quantaurus C11347).

Working Example 5—Stability in Thermal Test of Quantum Material Obtained from Example 2 after Functionalization with Benzenethiol (BT) and Addition of TPO 0.5 mL of quantum dots in toluene (30 mg/mL) are mixed with 18 mg benzenethiol for 16 hours. Excess of thiol is washed by addition of 2 mL ethanol. The QDs are dried, re-dissolved in toluene and added to another vial containing 1.2 mg (8 wt. %) TPO. Toluene is evaporated, and the vial is opened to air and heated at 150° C. for 1 hour. Afterwards, the solid is re-dissolved in toluene and QY is measured using Hamamatsu absolute quantum yield spectrometer (model: Quantaurus C11347).

The same experiment is performed without TPO (only with BT) for comparison.

Working Example 6—Synthesis of InP/ZnSeS Quantum Material 0.7 µL InP cores are mixed with 600 µL toluene and moved to a 4-neck flask. Then 14.8 mL oleylamine and 4.4 mL $ZnCl_2$ are added. The mixture is kept at 35° C. under vacuum for 30 min. Afterwards, the mixture is heated to 250° C. for 30 min under argon.

After the above core treatment, the mixture is cooled down to 190° C., and 10.4 mL $ZnCl_2$ in oleylamine is added. At 180° C., 1.8 mL TOP:Se (2M) is injected. The mixture is heated to 200° C. for 30 min, then to 320° C., followed by dropwise addition of 12.4 mL (0.4M) zinc undecylanate in oleylamine and 0.54 mL dodecanethiol.

Working Example 7—Purification of Quantum Material Obtained from Example 6

1 mL of a sample obtained from example 6 is purified from excess ligands using toluene and ethanol as solvent and antisolvent, respectively, followed by centrifugation and drying. The cleaning is repeated twice. The solid obtained is then dissolved in hexane and centrifuged. Hexane is evaporated, and the quantum dots are dissolved in toluene. The amount of organic ligands is calculated using thermal gravimetric analysis (TGA) (model TGA2, Metler Toledo). TG analysis showed 15 wt. % of organic content.

30 mg of the quantum dots obtained are dissolved in 1 mL toluene (30 mg/mL). QY is measured using Hamamatsu absolute quantum yield spectrometer (model: Quantaurus C11347).

Working Example 8—Stability in Thermal Test of Quantum Material Obtained from Example 7

0.5 mL of quantum dots in toluene (30 mg/mL) are dried under argon to remove toluene. The vial is then open to air and heated at 150° C. for 1 hour. Afterwards, the solid is re-dissolved in toluene and QY is measured using Hamamatsu absolute quantum yield spectrometer (model: Quantaurus C11347).

Working Example 9—Stability in Thermal Test of Quantum Material Obtained from Example 7 with TPO 0.5 mL of quantum dots in toluene (30 mg/mL) is added to another vial containing 1.2 mg (8 wt. %) TPO. Toluene is evaporated, and the vial is opened to air and heated at 150° C. for 1 hour. Afterwards, the solid is re-dissolved in toluene and QY is measured using Hamamatsu absolute quantum yield spectrometer (model: Quantaurus C11347).

List of abbreviations for the additive compounds used:

| | |
|---|---|
| TPO | Diphenyl(2,4,6-trimethylbenzoyl)phosphine oxide |
| PPO | Phenyl-bis(2,4,6-trimethylbenzoyl)phosphine oxide |
| TOPO | Triocylphosphine oxide |
| TPPO | Triphenylphosphine oxide |
| TOP | Trioctylphosphine |
| BPh | Benzophenone |

TABLE 1

Quantum yield for QDs

| Samples | Ligands/QY [%] | | |
|---|---|---|---|
| Example 2 | | 43 | comparative example |
| Example 3 | | 30 | comparative example |
| Example 4 | TPO | 43* | according to the invention |
| | PPO (4 wt. %) | 41 | according to the invention |
| | PPO (8 wt. %) | 40 | according to the invention |
| | TPPO | 30 | not according to the invention |
| | TOPO | 23 | not according to the invention |
| | TOP | 38 | not according to the invention |
| | BPh | 27 | not according to the invention |
| Example 5 | BT | 30 | comparative example |
| | BT + TPO | 40 | according to the invention |
| Example 7 | | 40 | comparative example |
| Example 8 | | 25 | not according to the invention |
| Example 9 | | 40 | according to the invention |

*when the same experiment is performed under inert conditions the QY with 8 wt. % TPO is increased from 43% to 52%.

As can be seen from table 1 above, when the nanosized light emitting material is combined with compounds TPO or PPO according to the invention, which compounds comprise phosphine oxide (P=O) and ketone (C=O) groups, thermal stability of InP/ZnSe QDs (Ex. 1 to 4) and of InP/ZnSeS QDs (Ex. 6 to 9) under air at 150° C. is improved as indicated by the quantum yield observed.

On the other hand, additive compounds that have only a phosphine oxide group (TOPO and TPPO) or only a ketone (C=O) group (BPh), or neither a phosphine oxide nor a ketone group (TOP), did not show any advantage compared to the original native ligands. An increase in QY from 43% to >50% can be reached when the thermal test with TPO is performed under inert conditions.

Combination of TPO and BT (benzenethiol) as an additive to the QDs has a dual advantage, as indicated by table 1, Example 5: Stability against radicals and stability to heat is improved. Functionalization of QDs with BT alone prevents radical damage but cannot protect the QDs against heat. However, when BT is combined with TPO, stability against radicals as well as stability against heat is achieved.

The invention claimed is:

1. A composition comprising at least one nanosized light emitting material and at least one compound represented by the following formula (1) or formula (2):

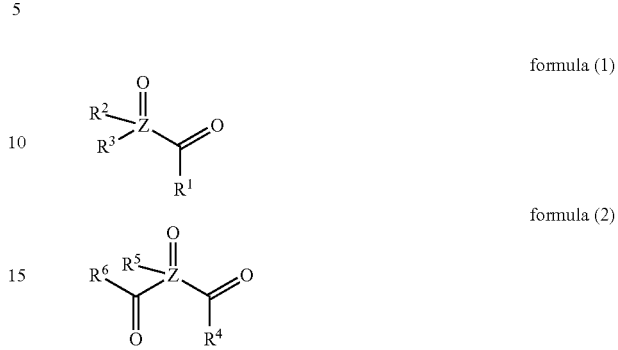

formula (1)

formula (2)

wherein
$R^1$, $R^2$, $R^3$, $R^4$, $R^5$, and $R^6$ are, identically or differently, selected from alkyl groups; and
Z is P, As or Sb.

2. The composition according to claim 1, wherein $R^1$, $R^2$, $R^3$, $R^4$, $R^5$, and $R^6$ are, identically or differently, selected from straight-chain alkyl groups having 1 to 30 C atoms and branched or cyclic alkyl groups having 3 to 30 C atoms.

3. The composition according to claim 1, wherein $R^1$, $R^2$, $R^3$, $R^4$, $R^5$ and $R^6$ are, identically or differently, selected from straight-chain alkyl groups having 1 to 20 C atoms and branched alkyl groups having 3 to 20 C atoms, which may in each case be substituted by one or more groups selected from F, Cl, Br, I, CN, (—OC(O)CHCH$_2$) or (—OC(O)C(CH$_3$)CH$_2$), aromatic groups having 5 to 20 aromatic ring atoms, and heteroaromatic groups having 5 to 20 aromatic ring atoms.

4. The composition according to claim 1, wherein at least one of $R^1$, $R_2$, and $R_3$ and at least one of $R^4$, $R^5$ and $R^6$ is substituted by one or more —OC(O)CHCH$_2$ and/or —OC(O)C(CH$_3$)CH$_2$ groups.

5. The composition according to claim 1, wherein Z is P.

6. The composition according to claim 1, wherein the composition comprises at least one compound of formula (1).

7. The composition according to claim 1, wherein the nanosized light emitting material has an inorganic part and the total amount of the compound of formula (1) and/or (2) in the composition is in the range from 1 wt.-% to 40 wt.-%, based on the inorganic part of the nanosized light emitting material.

8. The composition according to claim 7, wherein the total amount of the compound of formula (1) and/or (2) in the composition is in the range from 4 wt.-% to 32 wt.-% based on the inorganic part of the nanosized light emitting material.

9. The composition according to claim 1, further comprising a surface modifying ligand attached to a surface of the at least one nanosized light emitting material, said ligand being represented by the following formula (3) or formula (4):

$R^9$—SH  formula (3)

$R^{10}$—(CH$_2$)$_n$—SH  formula (4)

wherein

R$^9$ is selected from straight-chain alkyl groups having 1 to 40 C atoms, branched or cyclic alkyl groups having 3 to 40 C atoms, and alkenyl or alkynyl groups having 2 to 40 C atoms;

R$^{10}$ is selected from aromatic or heteroaromatic groups having 5 to 30 aromatic ring atoms, which may in each case be substituted by one or more groups selected from F, Cl, Br, I, CN, straight-chain alkyl groups having 1 to 20 C atoms and alkoxy groups having 1 to 20 C atoms; and n is 0 to 16.

10. The composition according to claim 1, wherein the composition further comprises additives selected from organic light emitting materials, inorganic light emitting materials, charge transporting materials, scattering particles, host materials, nanosized plasmonic particles, photo initiators, and matrix materials.

11. The composition according to claim 1, wherein the composition comprises at least one compound of formula (2).

12. A formulation comprising the composition according to claim 1 and at least one solvent.

13. A formulation according to claim 12, wherein said at least one solvent is selected from aromatic solvents, halogenated solvents, aliphatic hydrocarbons solvents, and mixtures thereof.

14. A formulation according to claim 12, wherein said at least one solvent is selected toluene, xylene, ethers, tetrahydrofuran, chloroform, dichloromethane, heptane, and mixtures thereof.

15. A process for manufacturing an optical medium comprising using a composition according to claim 1.

16. An electronic device, an optical device or a biomedical device containing a composition according to claim 1.

17. An optical medium comprising a composition according to claim 1.

18. An optical device comprising an optical medium according to claim 17.

* * * * *